United States Patent
Dottax et al.

(10) Patent No.: US 9,338,142 B2
(45) Date of Patent: May 10, 2016

(54) METHOD FOR VERIFYING THE SECURITY OF A DEVICE THAT GENERATES PRIVATE AND PUBLIC CRYPTOGRAPHIC KEYS

(71) Applicant: OBERTHUR TECHNOLOGIES, Colombes (FR)

(72) Inventors: Emmanuelle Dottax, Colombes (FR); Paul Dischamp, Colombes (FR); Marc Bertin, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 13/933,658

(22) Filed: Jul. 2, 2013

(65) Prior Publication Data
US 2014/0013102 A1   Jan. 9, 2014

(30) Foreign Application Priority Data
Jul. 4, 2012   (FR) ...................................... 12 56425

(51) Int. Cl.
*H04L 29/06* (2006.01)
*H04L 9/30* (2006.01)
*H04L 9/32* (2006.01)

(52) U.S. Cl.
CPC ............ *H04L 63/0428* (2013.01); *H04L 9/302* (2013.01); *H04L 9/3006* (2013.01); *H04L 9/321* (2013.01); *H04L 2209/26* (2013.01)

(58) Field of Classification Search
CPC ............................. H04L 63/0428; G06F 21/06
See application file for complete search history.

(56) References Cited

U.S. PATENT DOCUMENTS

| | | | |
|---|---|---|---|
| 4,944,007 A * | 7/1990 | Austin | 713/180 |
| 5,757,918 A * | 5/1998 | Hopkins | 705/67 |
| 6,411,715 B1 * | 6/2002 | Liskov et al. | 380/277 |
| 2010/0080391 A1 | 4/2010 | Shah et al. | |
| 2010/0235588 A1 | 9/2010 | Maeda et al. | |

FOREIGN PATENT DOCUMENTS

| | | | |
|---|---|---|---|
| WO | WO 99/20020 | * 10/1997 | H04L 9/30 |
| WO | 99/20020 A1 | 4/1999 | |

OTHER PUBLICATIONS

Kuwakado et al., "A New RSA-Type Scheme Based on Singular Cubic Curves" IEICE Trans. Fundamentals, vol. 1, Jan. 1996.
"Chapter 8: Public-Key Encryption ED—Menezes A J; Van Oorschot P C; Vanstone S A", Handbook of Applied Cryptography; [CRC Press Series on Discrete Mathematices and ITS Applications], CRC Press, Boca Raton, FL, US, pp. 283-319, Oct. 1, 1996, XP001525008.

(Continued)

*Primary Examiner* — Ellen Tran
*Assistant Examiner* — Wasika Nipa
(74) *Attorney, Agent, or Firm* — David D. Brush; Westman, Champlin & Koehler, P.A.

(57) ABSTRACT

A method for verifying the security of a device for generating private and public cryptographic keys. Such a method includes generating at least one pair of private and public cryptographic keys by the device from at least one random variable coming from a random-variable generator; transmitting at least one constituent element of a generated private or public key to at least one device for verifying; and determining a level of security of the device from the at least one transmitted element, as a function of pieces of information stored by the device for verifying.

15 Claims, 2 Drawing Sheets

(56) References Cited

OTHER PUBLICATIONS

Ari Jules, Jorge Guajardo: "RSA Key Generation with Verifiable Randomness", LNCS, 2002, pp. 357-374, XP002696690, Available Online at: www.rsa.com/rsalabs/staff/bios/ajuels/publications/kegver/kv-extended.pdf.

French Search Report and Written Opinion dated May 8, 2013 for corresponding French Application No. 1256425, filed Jul. 4, 2012.
Boneh et al., "Fast Varients of RSA" Cryptobytes, vol. 5, No. 1, pp. 1-9, 2002.

* cited by examiner (a)

(b)

METHOD FOR VERIFYING THE SECURITY OF A DEVICE THAT GENERATES PRIVATE AND PUBLIC CRYPTOGRAPHIC KEYS

1. FIELD OF THE INVENTION

The field of the invention is that of cryptography.

More specifically, the invention pertains to a technique for verifying the level of security of a device that generates (private and/or public) cryptographic keys.

The invention has numerous applications, for example during a phase for customizing or personalizing smartcards.

2. TECHNOLOGICAL BACKGROUND

The generation of cryptographic keys for the RSA cryptosystem comprises especially the determining of two prime numbers, denoted as p and q, which define a part of the public key, namely the number N which is the product of these two prime numbers (i.e. N=pq).

In order to ensure that the RSA keys generated are of a sufficient level of security, it is necessary to use a device that generates a random variable r, possessing sufficiently great entropy, used in combination with methods for generating keys (such as for example those specified in the IEEE P1363, ANSI X9.31 and FIPS 186-3 standards).

Even though the private keys thus generated are supposed to ensure a level of security (because they are generated by the application of algorithms validated by the scientific community), there are nevertheless certain flaws. In particular, there is vulnerability that can be related to the presence of a same prime number in several of the moduli generated.

The frequency of appearance of a same prime number in the generation of several moduli is theoretically very low. However, a bug in a computer program or in a piece of hardware of the generating device can induce this type of behavior, whether erratically or not, during the generation of a plurality of RSA keys.

Such a problem can also arise when creating cryptographic keys for variants of RSA cryptosystems, such as for example the Koyama scheme (described in Kuwakado et al, "A new RSA type scheme based on singular cubic curves $y^2=x^3+bx^2$ mod n" in Annals of the IEICE conference 1996) and other variants proposed by Boneh et al in "Fast Variants of RSA", such as the RSA using at least three prime numbers to define a public modulus ("Multi-prime RSA") and the Takagi scheme using a public modulus of the following form: $N=p^t q$, where p and q are prime numbers and t is an integer greater than or equal to 2.

In order to mitigate these problems, a first technique proposed by An Juels and Jorge Guajardo in "RSA Key Generation with Verifiable Randomness" in the Annals of the PKS conference 2002, consists of the use of a zero-knowledge disclosure protocol.

However, this technique is complex to implement and does not provide for a generic solution (i.e. a solution that can easily be adapted to variants of the RSA cryptosystem). Furthermore, in such a technique, the generation of keys requires the distribution of the computations among a plurality of devices and, in addition, the performance of data exchanges which slow down the process for generating keys.

3. SUMMARY OF THE INVENTION

The present invention proposes a solution to the above-mentioned problem that is easy to implement.

One particular embodiment of the invention proposes a method for verifying the security of a key generating device that generates private and public cryptographic keys. Such a method is remarkable in that it comprises:

- a step for generating of at least one pair of private and public cryptographic keys by means of said key generating device from at least one random variable coming from a random-variable generator;
- a step for transmitting at least one constituent element of a generated private or public key to at least one verifying device for verifying, and
- a step for determining the level of security of said key generating device, from said at least one transmitted element, as a function of the pieces of information stored by said at least one verifying device.

The general principle of the invention therefore consists in implementing a technique for verifying the level of security of a key generating device that generates cryptographic keys via a step for determining performed on the constituent element or elements of keys received. Contrary to the techniques for testing compliance of implementation, which necessitate preset parameters (such as the value of a seed for a generator), the present technique uses at least one random variable, in principle unpredictable, obtained from a random-variable generator (for example a hardware generator of random variables). Thus, the present technique is used to test the security of both the random-variable generator and of the steps included in the step for generating. The technique therefore makes it possible to determine a level of security of the key generating device by means of a third-party device, namely the verifying device.

The step for determining comprises a step for determining a relationship between the transmitted element and at least one piece of information stored by said at least one verifying device. Thus, a relationship such as this (which results from the performance of a computation step performed by the verifying device) makes it possible to determine a security level and hence to verify the security of a key generating device.

According to one variant, a method is proposed for verifying the security of a key generating device that generates cryptographic keys capable of being used in a symmetrical cryptosystem, said method comprising:

- a step for generating a private cryptographic key by means of said key generating device from at least one random variable coming from a random variable generator;
- a step for transmitting at least one constituent element of said private cryptographic key to at least one verifying device;
- a step for determining the level of security of said key generating device from said at least one transmitted element as a function of pieces of information stored by said at least one verifying device.

According to one particular aspect of the invention, there is proposed a method for verifying that is remarkable in that the element transmitted, constituting a public key, is a modulus corresponding to the product of at least two prime numbers generated during said step for generating.

Such a method makes it possible, on the basis of a constituent element of a key (such as for example a modulus used in an RSA cryptosystem which is a constituent element of a public key formed by the following pair (e, N) where e is the public exponent), to determine whether the key generating device comprises a software or hardware bug.

According to one particular characteristic, a method for verifying of this kind is remarkable in that the step for determining comprises a step for determining the greatest common divisor of said modulus and another modulus coming from the pieces of information stored by said at least one verifying device.

Thus, when the verifying device receives a modulus coming from a key generating device, it makes an attempt to determine one of the prime numbers constituting said modulus from pieces of information stored by said verifying device, said pieces of information corresponding for example to other moduli generated either by other devices for generating cryptographic keys or by the key generating device whose security the verification process seeks to verify. To perform this step for determining, the verifying device performs a step for determining the greatest common divisor of two distinct moduli. If the result is equal to 1, then the moduli do not share any prime numbers and the security is ensured against the above-mentioned vulnerability coming from a bug. However, if a prime number is obtained from the operation for determining the greatest common divisor of two distinct moduli, then it means that a bug is potentially present in the key generating device. Additional measurements and tests must then be performed within devices for generating cryptographic keys that has generated the moduli sharing a same prime number.

According to one particular characteristic, such a method for verifying is remarkable in that said step for determining further comprises a step for testing the divisibility of the modulus by at least one prime number coming from pieces of information stored by said at least one verifying device.

Thus, the verifying device makes a test to find out if the moduli received are divisible by at least one prime number stored in this device.

According to one particular characteristic, such a method for verifying is remarkable in that, when a plurality of pairs of cryptographic keys is generated, the method further comprises, before said step for transmitting:
  a step for comparing private keys, generated during said step for generating, with one another, said steps for comparing being performed by said key generating device; and
  a step for transmitting a piece of information on anomaly to said verifying device, in the event of detection of a presence of at least one element identical between two private keys generated.

Thus, the key generating device itself performs tests in order to determine whether it has generated a same prime number several times. Should the key generating device detect such a fact, it means that a malfunction has occurred, arising either from a software bug or from a hardware bug.

According to one particular characteristic, such a method for verifying is remarkable in that the transmitted element, constituting a private key, is a pair of prime numbers generated during said step for generating and in that the step for determining comprises a step for comparing prime numbers of said pair of prime numbers with prime numbers coming from pieces of information stored by said at least one verifying device.

According to one particular characteristic, such a such a method for verifying is remarkable in that said step for determining further comprises a step for testing the divisibility of moduli, coming from pieces of stored information, by at least one of the prime numbers of said pair of prime numbers.

According to one particular characteristic, such a method for verifying is remarkable in that said step for comparing comprises a search in a sorted array.

According to one particular characteristic, such a method for verifying is remarkable in that the step for generating generates at least 10 000 pairs of cryptographic keys.

According to one particular characteristic, such a method for verifying is remarkable in that said verifying device communicates with a plurality of devices for generating private and public keys.

At the same time as it tests a plurality of devices for generating keys, the device can therefore use the elements transmitted by these devices to store them for subsequent use, especially during the step for determining. Thus, the verifying device can constitute a considerable database in being in relationship with a plurality of devices for generating private and public cryptographic keys.

According to one particular characteristic, a method for verifying of this kind is remarkable in that the verifying device communicates with at least 10 devices for generating cryptographic keys.

According to one particular characteristic, such a method for verifying is remarkable in that the key generating device generates keys compatible with the RSA cryptosystem.

According to one variant, the key generating device can generate keys compatible with a symmetrical cryptosystem such as the DES or AES systems.

According to one particular characteristic, such a method for verifying is remarkable in that the key generating device is contained in a smartcard and in that an application executed on said smartcard coordinates exchanges between said generator of cryptographic keys and the verifying device.

Thus, an application such as a Java Card applet can be executed on the smartcard in order to coordinate exchanges between the card and the device for verifying.

According to one particular characteristic, a method for verifying of this kind is remarkable in that the device for verifying is contained in a system for personalizing a device comprising said key generating device.

Another embodiment of the invention proposes a computer program product comprising program code instructions for implementing the above-mentioned method (in any one of its different embodiments) when said program is executed on a computer.

Another embodiment of the invention proposes a non-transitory computer-readable storage medium storing a computer program comprising a set of instructions executable by a computer to implement the above-mentioned method (in any one of its different embodiments).

Another embodiment of the invention proposes a verifying device for verifying the security of a key generating device that generates private and public cryptographic keys. A verifying device of this kind is remarkable in that it comprises:
  means for receiving at least one constituent element of a private or public key generated by said key generating device, and
  means for determining the level of security of said key generating device from said at least one received element, as a function of the pieces of information stored by said at least one verifying device.

According to one variant, when the received element, constituting a public key, is a modulus corresponding to the product of at least two prime numbers generated by said generating device, said means for verifying comprise means to obtain a common divisor that is the greatest common divisor of said modulus and another modulus coming from the pieces of information stored by said at least one verifying device.

Another embodiment of the invention proposes a key generating device for generating private or public cryptographic keys. When a plurality of pairs of cryptographic keys is generated by said key generating device, this device comprises:

means for comparing the generated private keys with one another; and means for transmitting a piece of information on anomaly towards a verifying device in the event of detection of a presence of at least one element identical between two generated private keys.

Thus, in case of reception of such a piece of information on anomaly, the verifying device can detect a malfunction of the key generating device having an impact on the trust that a user can place in such a device (this corresponds to a low level of security).

4. LIST OF FIGURES

Other features and advantages of the invention shall appear from the following description, given by way of an indicative and a non-exhaustive example, and from the appended figures, of which:

5. DETAILED DESCRIPTION

In all the figures of the present document, the identical elements and steps are designated by a same numerical reference.

Figure 1:
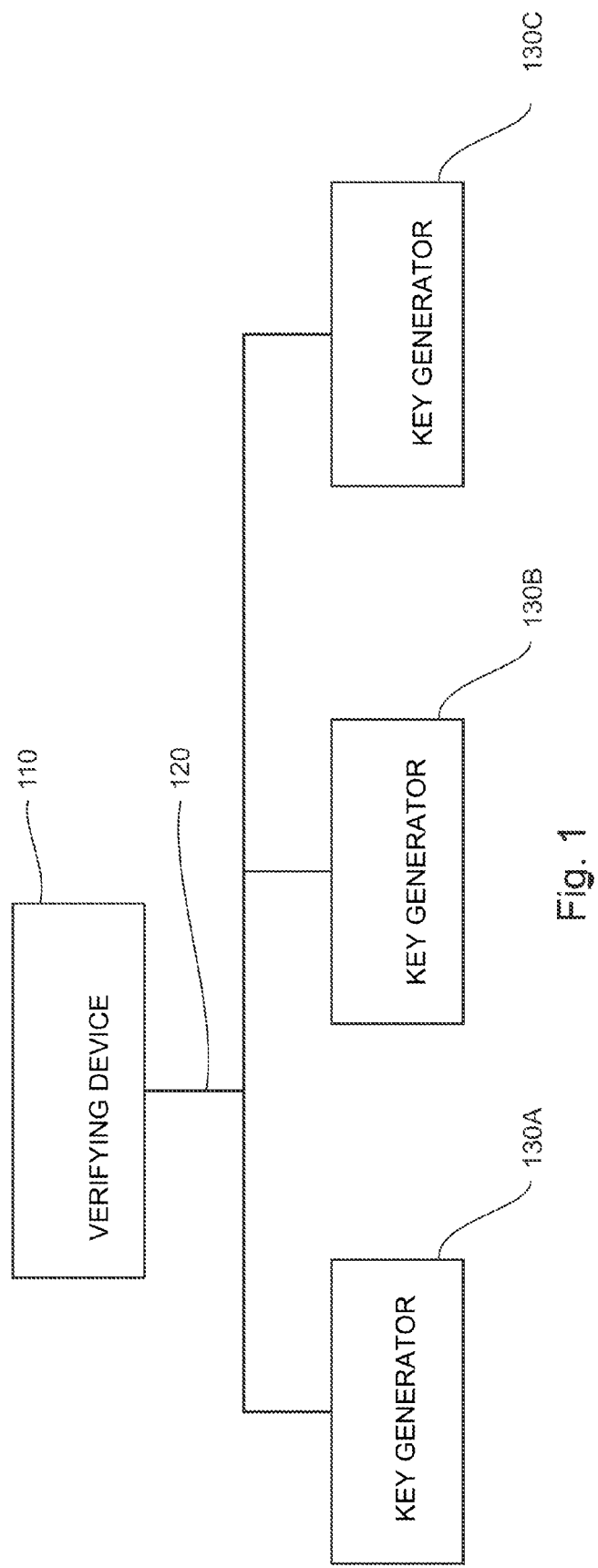
FIG. 1 is a block diagram of a system for personalizing devices for generating cryptographic keys implementing a method of verification according to one particular embodiment of the invention.

FIG. 1 is a block diagram of a system for personalizing devices for generating cryptographic keys implementing a method of verification according to one particular embodiment of the invention.

More specifically, a personalizing system of this kind comprises a verifying device 110 capable of communicating, via communications buses 120 (or other wire-based or wireless means) with a plurality of devices 130 (individually labeled 130A-130C in FIG. 1) for generating private and public cryptographic keys (for cryptosystems such as the RSA and its variants).

In order to ensure that the devices 130 do not contain any bugs causing the generation of a plurality of public keys comprising a same prime number, the verifying device 110 can carry out a verification of the security of the devices 130 as follows:

In one embodiment, each device 130 will generate a plurality of private RSA keys constituted by three elements (namely the elements d, p and q corresponding respectively to the private exponent and to two prime numbers), and the corresponding public RSA keys constituted by two elements (namely the elements e, N respectively corresponding to the public exponent and to the public modulus).

Once these keys have been generated, each device 130 transmits either the public moduli or the generated prime numbers to the verifying device 110.

Thus, in one embodiment of the invention, in receiving a large number of moduli or prime numbers from each device 130, the verifying device 110 stores them and thus sets up a large database. These pieces of information (prime numbers and/or moduli) will be used to determine whether a same prime number has been generated either by a same device 130 or by distinct devices 130. Since the probability that such an event will occur is low, the occurrence of such a "collision" must be studied attentively by the managers of personalizing systems because it may mean that a bug is present in the incriminated devices 130.

In the embodiment in which prime numbers (which are elements of private RSA keys) are transmitted to the verifying device 110, the prime numbers received are either compared with the prime numbers stored or used to verify that they divide a stored modulus.

In another embodiment in which only moduli (which are elements of public RSA keys) are transmitted to the verifying device 110, the received moduli are either compared to the stored moduli or the greatest common divisors of the moduli are determined or tests of divisibility of the received moduli are made on the basis of stored prime numbers.

Such a verification technique can of course be easily adapted to variants of the RSA cryptosystem.

It must be noted that, according to a first variant, the key generating device is contained in a smartcard and the verifying device is contained in a computer.

According to a second variant, the key generating device is contained in a smartcard and the verifying device is a hardware security module (HSM).

According to a third variant, the key generating device is contained in a first computer and the verifying device is contained in a second computer.

According to a fourth variant, the key generating device is contained in a computer and the verifying device is contained in the same computer.

Thus, according to the third and fourth variants, the present technique makes it possible to test the method for generating cryptographic keys implemented by a computer (which executes a computer for generating cryptographic keys) via the execution of another software (which implements the step for determining the level of security according to the present invention) either on the same computer or on another computer.

Figure 2:
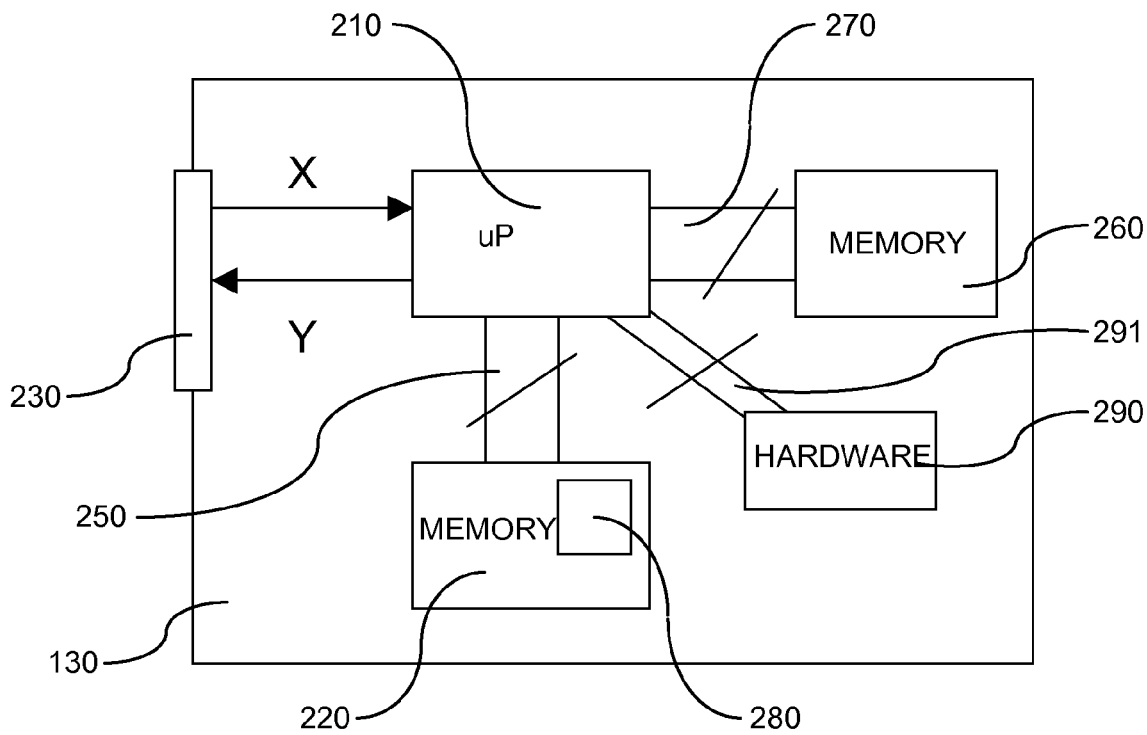
FIG. 2(a) is a schematic view of a key generating device that generates cryptographic keys in which the present invention is implemented.
FIG. 2(b) represents a microcircuit card which constitutes an example of a key generating device according to the invention as represented in FIG. 2(a).
Figure 2:
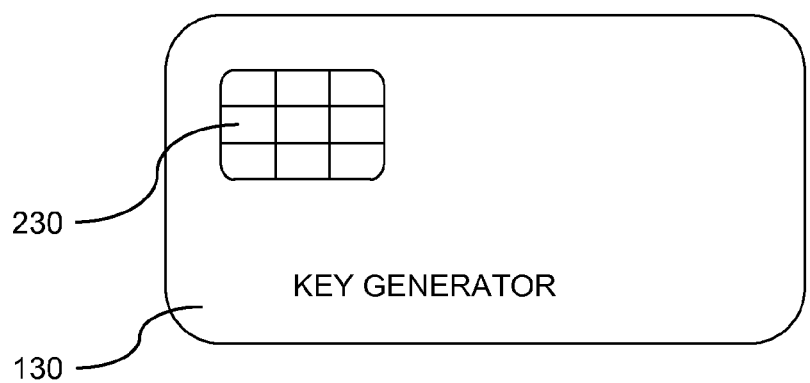

FIG. 2(a) schematically shows a device 130 for generating cryptographic keys (private and public). This device 130 comprises a microprocessor 210 with which there is associated firstly a random-access memory 260, for example by means of a bus 270, and secondly a non-volatile memory 220 (for example of the type EEPROM), for example through a bus 250. It must be noted that, in one embodiment, a device 130 for generating cryptographic keys and a verifying device 110 differ only in the size of the memories and the power of the microprocessor 210 (since the verifying device must process and perform more operations than a key generating device, this device comprises more substantial resources). Thus, the components mentioned are also present in a verifying device. In another embodiment, the verifying device 110 is a computer containing substantial hardware resources.

The device 130 and more specifically the microprocessor 210 that it incorporates can exchange data with external devices by means of a communications interface 230.

FIG. 2(a) schematically represents the transmission of a piece of input data X received from an external device (not shown) and transmitted from the communications interface 230 to the microprocessor 210. Similarly, the figure shows the transmission of a piece of output data Y from the microprocessor 210 to the communications interface 230 towards an external device. This output data Y comes from a data-processing operation by the microprocessor 210, generally on the input data X by means of a piece of secret data 280 internal to the system, for example a private key or a random variable. A random variable of this kind can be obtained through a piece of dedicated hardware 290 which is connected to the microprocessor 10 by means of a bus 291. The private key can be obtained through the execution of a code stored in the memory 220 by the microprocessor 210 in combination with the hardware 290.

The pieces of input data X are, for example, APDU commands and the pieces of output data are APDU responses.

Although, for the sake of illustration, the input data and the output data are shown on different arrows; the physical means that enable communications between the microprocessor 210 and the interface 230 can be set up by one and the same means, for example one series communications port or one bus.

The microprocessor 210 is capable of executing a software program (or computer program) to perform the steps for generating a plurality of (private or public) cryptographic keys in combination with the dedicated hardware 290 as well as all the steps mentioned here above that are implemented in the key generating device. The part of the method for verifying performed by the key generating device is for example executed by the device 130 upon reception of the pieces of input data X which are then sent out by a verifying device. The implementing of the method for verifying as described in this document makes it possible to validate the fact that the software program used to generate prime numbers, which is formed by a series of command instructions of the microprocessor 210 stored, for example, in the memory 220 as well as the hardware 290, do not contain any bugs liable to jeopardize the security of the information of a user of such a device 130.

In one variant, the assembly formed by the microprocessor 210, the non-volatile memory 220 and the random-access memory 260 can be replaced by an applications-specific circuit which then comprises means for implementing the different steps of the method at the level of the device 130.

FIG. 2(b) represents a microcircuit card which constitutes an example of a key generating device that generates cryptographic keys according to the invention as shown in FIG. 2(a). The communications interface 230 in this case is set up by means of contacts of the microcircuit card or else an antenna housed in the body of the card.

The microcircuit card incorporates a microprocessor 210, a random-access memory 260 and a non-volatile memory 220 as shown in FIG. 2(a).

This microcircuit card is compliant for example with the ISO 7816 standard and provided with a secured microcontroller that groups together the microprocessor (or CPU) 220 and the random-access memory 260.

The pieces of input data X are for example APDU commands and the output data are APDU responses.

In one variant, the key generating device keys can be a USB stick, a document or a paper information carrier comprising, in one of its sheets, a microcircuit associated with contactless communications means. In a preferred manner, this is a portable or handheld entity.

The device 130 can also comprise means capable of protecting it against attacks designed to fraudulently obtain secret data which it stores (for example a cryptographic key) such as fault-based attacks and/or side-channel analysis attacks. In particular, the device is compliant with the FIPS standard or with common criteria.

The invention claimed is:

1. A method for verifying security of a key generating device that is configured for generating private and public cryptographic keys, wherein the method comprises:
generating at least one pair of private and public cryptographic keys by a processor of said key generating device from at least one random variable coming from a random-variable generator;
transmitting a public key and at least one constituent element of a generated private key through a communications interface of said key generating device to at least one verifying device, wherein the at least one constituent element comprises a pair of prime numbers generated during said generating and wherein the public key is a modulus corresponding to the product of at least two prime numbers generated during said generating, and
determining a level of security of said key generating device, from said transmitted at least one constituent element, as a function of pieces of information stored by said at least one verifying device, comprising comparing with a processor of the at least one verifying device the prime numbers of said pair of prime numbers with prime numbers coming from the pieces of information stored by said at least one verifying device and comprising determining a greatest common divisor of said modulus and another modulus coming from the pieces of information stored by said at least one verifying device.

2. The method for verifying according to claim 1, wherein said step of determining further comprises testing the divisibility of the modulus by at least one prime number coming from the pieces of information stored by said at least one verifying device.

3. A method for verifying security of a key generating device that is configured for generating private and public cryptographic keys, wherein the method comprises:
generating a plurality of pairs of private and public cryptographic keys by a processor of said key generating device from at least one random variable coming from a random-variable generator, wherein each of the public keys are a modulus corresponding to the product of at least two prime numbers generated during said generating;
transmitting at least one constituent element of a generated private key or public key through a communications interface of said key generating device to at least one verifying device;
determining a level of security of said key generating device, from said transmitted at least one constituent element, as a function of pieces of information stored by said at least one verifying device, including determining a greatest common divisor of said modulus and another modulus coming from the pieces of information stored by said at least one verifying device; and
before said transmitting:
comparing private keys, generated during said generating, with one another, said comparing being performed by the processor of said key generating device; and
transmitting a piece of information on anomaly through the communications interface of the key generating device to said verifying device, in the event of detection of a presence of at least one element identical between two private keys generated.

4. The method for verifying according to claim 1, wherein said determining further comprises testing the divisibility of moduli, coming from pieces of stored information, by at least one of the prime numbers of said pair of prime numbers.

5. The method for verifying according to claim 1, wherein said comparing comprises a search in a sorted array.

6. The method for verifying according to claim 1, wherein the generating generates at least 10 000 pairs of cryptographic keys.

7. The method for verifying according to claim 1, wherein said verifying device communicates with a plurality of key generating devices for generating private and public keys.

8. The method for verifying according to claim 7, wherein the verifying device communicates with at least 10 key generating devices for generating cryptographic keys.

9. The method for verifying according to claim 1, wherein the key generating device for generating cryptographic keys generates keys compatible with the RSA cryptosystem.

10. The method for verifying according to claim 1, wherein the key generating device is contained in a smartcard and an application executed on said smartcard coordinates exchanges between said generator of cryptographic keys and the verifying device.

11. The method for verifying according to claim 1, wherein the verifying device is contained in a system for personalizing a device comprising said key generating device.

12. A verifying device for verifying the security of a key generating device that is configured for generating private and public cryptographic keys, wherein the verifying device comprises:
    means for receiving at least one constituent element of a private key generated by said key generating device, wherein the constituent element comprises a pair of prime numbers generated by said key generating device, and for receiving a public key that is a modulus corresponding to the product of at least two prime numbers generated by said key generating device, and
    means for determining a level of security of said key generating device from said received at least one constituent element, as a function of pieces of information stored by said verifying device, comprising comparing the prime numbers of said pair of prime numbers with prime numbers coming from the pieces of information stored by said at least one verifying device, comprising obtaining a common divisor that is the greatest common divisor of said modulus and another modulus coming from the pieces of information stored by said verifying device.

13. The method for verifying of claim 1, wherein:
    the stored information includes transmitted pairs of prime numbers received by the at least one verifying device from at least one of the key generating device or one or more other key generating devices.

14. The method for verifying of claim 1, wherein comparing the prime numbers of said pair of prime numbers of the generated private key with prime numbers coming from the pieces of information stored by said at least one verifying device comprises:
    determining whether at least one of the prime number of the generated private key are the same as the prime numbers coming from the pieces of information stored by said at least one verifying device.

15. The method for verifying of claim 1, wherein determining a level of security comprises detecting at least one of a software bug or a hardware bug in the key generating device as a function of the comparing.

* * * * *